(12) United States Patent
Dinges et al.

(10) Patent No.: US 7,898,978 B2
(45) Date of Patent: Mar. 1, 2011

(54) METHOD FOR DETERMINING A NETWORK TOPOLOGY OF AN AUTOMATION SYSTEM

(75) Inventors: Clemens Dinges, Obermichelbach (DE); Michael Schlereth, Wilhermsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 1022 days.

(21) Appl. No.: 10/491,039

(22) PCT Filed: Sep. 17, 2002

(86) PCT No.: PCT/DE02/03498
§ 371 (c)(1),
(2), (4) Date: Mar. 26, 2004

(87) PCT Pub. No.: WO03/030466
PCT Pub. Date: Apr. 10, 2003

(65) Prior Publication Data
US 2004/0243695 A1    Dec. 2, 2004

(30) Foreign Application Priority Data

Sep. 27, 2001  (EP) .................................... 01123168
Dec. 6, 2001   (DE) ................................. 101 59 930

(51) Int. Cl.
*H04L 12/28*   (2006.01)
*G06F 15/177*  (2006.01)
(52) U.S. Cl. ........................................ 370/254; 709/220
(58) Field of Classification Search .................. 370/254, 370/257
See application file for complete search history.

(56) References Cited

U.S. PATENT DOCUMENTS

| | | | |
|---|---|---|---|
| 4,507,777 A | 3/1985 | Tucker et al. | |
| 5,754,767 A | 5/1998 | Ruiz | |
| 6,205,362 B1 | 3/2001 | Eidson | |
| 6,480,889 B1 * | 11/2002 | Saito et al. | 709/220 |
| 6,553,310 B1 * | 4/2003 | Lopke | 701/213 |
| 6,782,436 B1 * | 8/2004 | Baker | 710/43 |
| 7,139,835 B2 * | 11/2006 | Fouquet et al. | 709/238 |
| 7,307,962 B2 * | 12/2007 | Pulsipher | 370/254 |
| 2002/0102989 A1 * | 8/2002 | Calvert et al. | 455/456 |
| 2002/0154606 A1 * | 10/2002 | Duncan et al. | 370/256 |

FOREIGN PATENT DOCUMENTS

EP     0 493 157 A2    11/1991

OTHER PUBLICATIONS

The Authoritative Dictionary of IEEE Standards Terms, Seventh Edition, (Dec. 2000), pp. 1190.*

\* cited by examiner

*Primary Examiner* — Pankaj Kumar
*Assistant Examiner* — Marcus R Smith

(57) ABSTRACT

The invention relates to a method for determining a network topology of a distributed automation system comprising a plurality of automation devices that are connected to the system. The method comprises the following steps: a) a first automation device directs a request into the automation system, b) each automation device that has been reached by the request transmits a response containing information about the position of the automation device, c) the first automation device generates a representation of the network topology of the distributed automation system from all the responses.

3 Claims, 2 Drawing Sheets

METHOD FOR DETERMINING A NETWORK TOPOLOGY OF AN AUTOMATION SYSTEM

CROSS REFERENCE TO RELATED APPLICATIONS

This application is the US National Stage of International Application No. PCT/DE02/03498, filed Sep. 17, 2002 and claims the benefit thereof. The International Application claims the benefits of European Patent application No. 01123168.5 EP filed Sep. 27, 2001 and German application No. 10159930.7 DE filed Dec. 6, 2001, all of the applications are incorporated by reference herein in their entirety.

FIELD OF INVENTION

The invention relates to a method for determining a network topology of an automation system with a number of stations which are arranged on interconnected bus segments of a bus line.

BACKGROUND OF INVENTION

According to "Klaus Lipinski (publisher): Lexikon der Datenkommunikation [Lexicon of Data Communications], 1995, 3rd edition, DATACOMM Buchverlag", physical topology is defined as the configuration of network nodes and connections. The possible logical connections of network nodes are called logical topology. Logical topology indicates which node pairs can communicate with one another and whether they are directly physically connected to one another. The physical and logical topology need not be identical in networks. Known network topologies are star, tree, ring and bus.

The prior (§3 para. 2 No. 2 Patent Act and Art. 54 para. 3 EPC) European patent application No. 001123168.5 discloses a method for dynamic access to automation resources, whereby in a distributed automation system with a number of automation components a first automation component which looks for an automation resource sends a request to the automation system, and in response to this request receives from all reachable automation components a response concerning available suitable automation resources, and then selects the automation component with the suitable automation resource and uses the automation resource.

The invention consists of specifying a method with which at any time the current topology of an automation system can be determined, so that it is easier to locate individual stations, for instance for maintenance purposes.

This object is achieved according to the invention with the features of Claim 1. To this end a method is provided for determining the network topology of the distributed automation system with a plurality of automation devices connected thereto with the following steps:

First a first automation device, e.g. a programming device temporarily connected to the bus, sends a request to the automation system. Each automation device reached by the request then sends a response to the first automation device containing information on the position of the automation device that has been reached. Finally the first automation device generates a representation of the network topology of the distributed automation system from all the responses.

The advantage of the invention consists in the fact that manual determination of the network topology, for instance from what is known as configuration data, which is time-consuming and prone to error, is avoided and the network topology of the automation system can be determined automatically with the method according to the invention and above all on an up-to-date basis. The representation of the network topology determined can then be adapted to individual requirements, since all information is available electronically.

The dependent claims are directed at preferred embodiments of the present invention.

The method according to the invention is advantageously designed such that the first automation device sends the request to each automation device directly connected to it and each automation device reached by the request forwards the request to each further automation device directly connected to it in each case. In this way the number of communication procedures is reduced and it is not necessary to make a distinction between valid requests and other requests arriving later, to which there is no longer any need to reply and which are thus implicitly invalid.

If each automation device reached by the request which has a port for a peripheral device sends back information about the connected process peripheral devices, the determined network topology includes not only the topology of the communication users directly or indirectly connected to the bus, but also devices provided for controlling and/or monitoring an external technical process. Expanding a network topology in this way also makes it easier to locate such process peripheral devices in an extensive and complex system.

Advantageously the information on the position of the automation device reached includes a location code of the automation device reached. With this information it is possible to generate a topology of the automation system in respect of the geographical location of the individual communication users in the automation system.

Additionally advantageously the information on the position of the automation device reached includes a network address of the automation device reached.

BRIEF DESCRIPTION OF THE DRAWINGS

An embodiment of the invention is described in greater detail below on the basis of the drawing. Objects or elements corresponding to one another are provided with the same reference characters in all figures.

The drawings show.

DETAILED DESCRIPTION OF INVENTION

Figure 1:
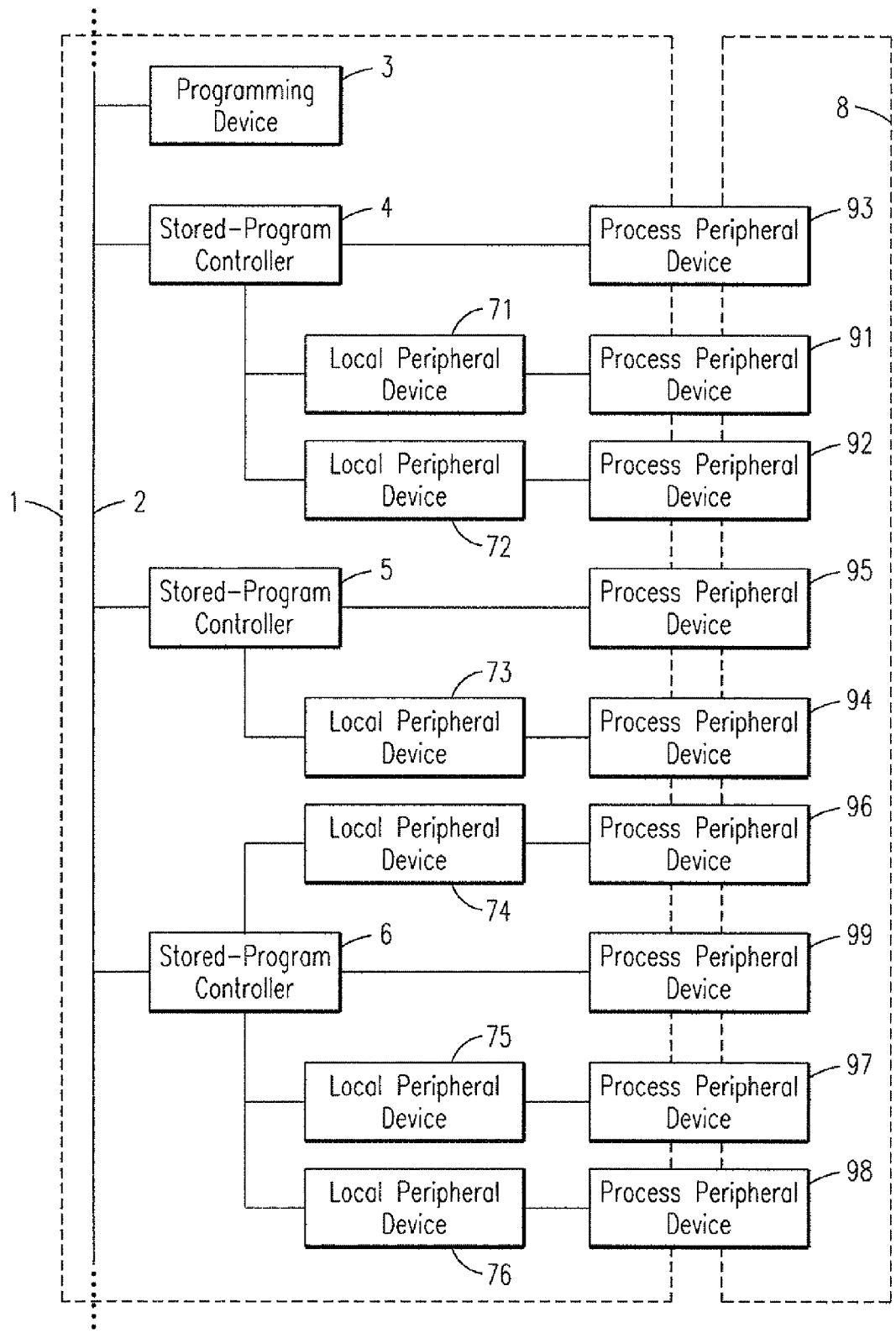
FIG. 1 an automation system.

FIG. 1 shows an automation system 1 with automation devices 3, 4, 5, 6 connected via a bus 2. A first automation device 3 is for example what is known as a programming device 3, which for example makes it possible for a service engineer to perform maintenance work on the automation system. The programming device 3 is only temporarily connected to the bus 2. The automation devices 4, 5, 6 permanently connected to the bus 2 are each connected communicatively with other automation devices 71, 72, 73, 74, 75, 76. The automation devices 4, 5, 6 permanently connected to the bus 2 are, for example, what are known as stored-program controllers 4, 5, 6. The other automation devices 71-76 are, for example, what are known as local peripheral devices 71-76.

The automation system 1 is provided to control and/or monitor a technical process 8 represented only schematically. To control or monitor the process 8, process peripheral devices 91, 92, 93, 94, 95, 96, 97, 98, 99 are provided as a further group of automation devices. The process peripheral devices 91-99 are, for example, actuators 91-99 or sensors 91-99 and are thus suitable for recording measured values from the process 8 or for controlling devices, e.g. valves or motors, in the process 8. The process peripheral devices 91-99 are either connected to a stored-program controller 4, 5, 6 or to a local peripheral device 71-76.

Each of the devices 4-6, 71-76, 91-99 has a concrete position in the actual system. Position can here mean either the actual spatial position or a position in respect of a particular system component. Such position designations are encoded in a location code of the respective device 4-6, 71-76, 91-99. In a corresponding configuration, information regarding the position of a device 4-6, 71-76, 91-99 can also be derived from the network address of said device.

If a service engineer who does not know the automation system and its topology requires up-to-date information on the topology he can connect the programming device 3 to the bus and execute the method according to the invention using the programming device 3.

The programming device 3 then sends a request to the automation system 1. Each automation device 4-6, 72-76 reached by the request sends a reply to the programming device 3 containing information on the position of the automation device 4-6, 72-76 reached. The programming device 3 generates a representation of the network topology of the distributed automation system 1 from all the replies.

Figure 2:
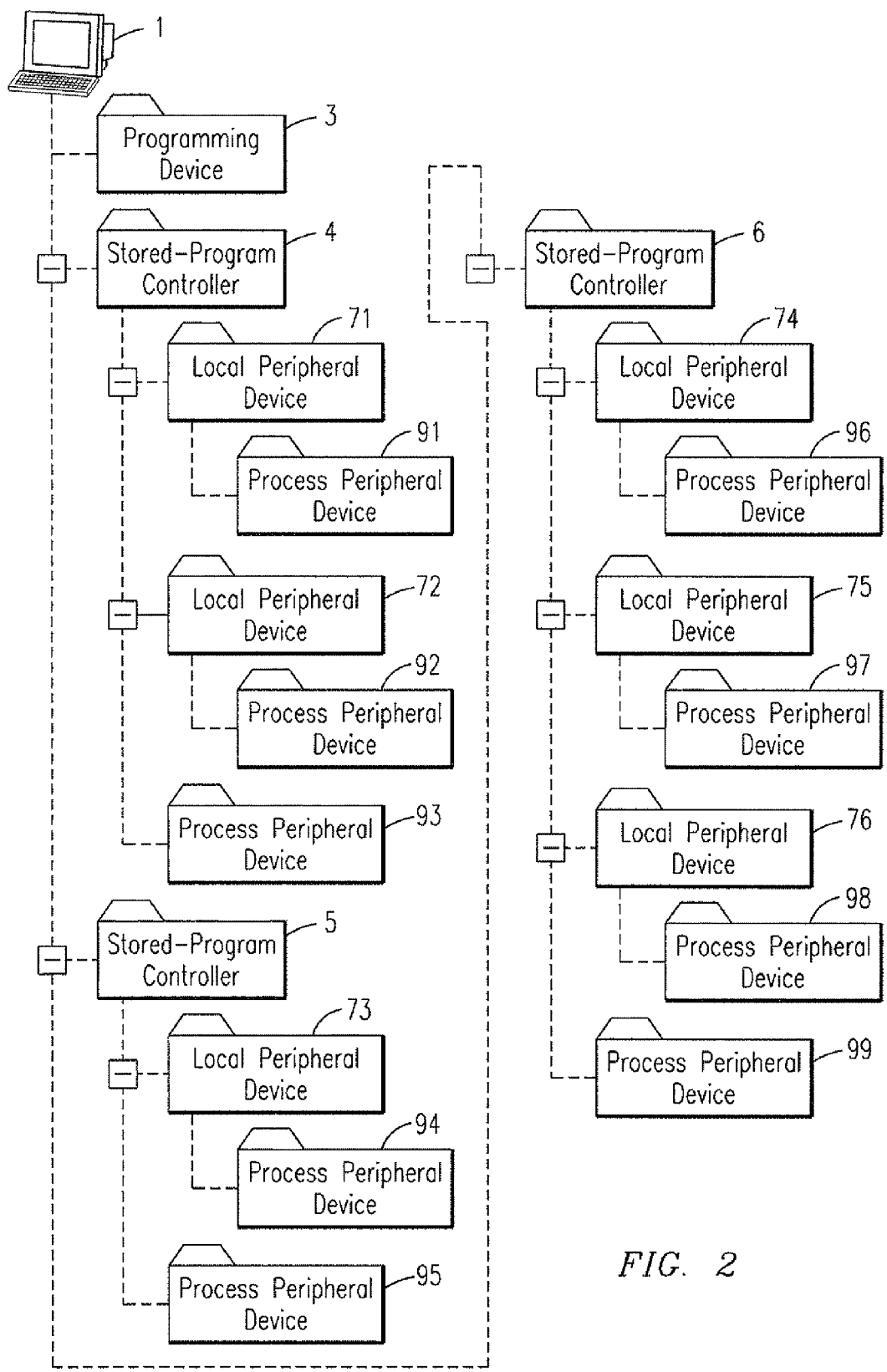
FIG. 2 a representation of a network topology of an automation system.

An exemplary representation of such a network topology for the automation system according to FIG. 1 is shown in FIG. 2. The representation shown in FIG. 2 of the network topology is a representation of the logical topology of the automation system 1, because it is apparent from the representation that a first local peripheral device 71 is connected physically only to a first process peripheral device 91. Each data transfer from and to the first process peripheral device 91 thus takes place by means of the first local peripheral device 71. Likewise it is apparent from the representation that each data transfer from and to the first local peripheral device is implemented via the automation device 4.

A corresponding representation of the physical topology (not shown) of the automation system 1 shows to scale the actual spatial distances between the individual devices 4-6, 71-76, 91-99. Such a representation makes it easier rapidly to locate individual devices 4-6, 71-76, 99-99 in an unknown or complex and extensive system.

The invention can thus be represented as follows:

A method for determining the network topology of a distributed automation system 1 with a plurality of automation devices 3, 4, 5, 6 connected thereto is specified, which includes the following steps:

a first automation device 3 sends a request to the automation system 1, each automation device 4, 5, 6 reached by the request sends a reply to the first automation device 3 containing information on the position of the automation device 4 to 6 reached, the first automation device 3 generates a representation of the network topology of the distributed automation system 1 from all the replies.

The invention claimed is:

1. A method for determining a network topology of a distributed automation system having a plurality of automation devices connected to the system, comprising: assigning a network address to each of the automation devices; sending a request for information from a first automation device to a plurality of other ones of the automation devices within the automation system; wherein a first of the first automation devices sends the request to each automation device connected directly to the first automatic device and wherein each automation device reached by the request forwards the request to each further automation device connected directly to the applicable automation device; sending a reply from each automation device receiving the request, each reply including a location code suitable, in combination with location codes provided in other replies, for generating a topology of the automation system determinative of physical positions of the replying automation devices, wherein actual spatial positions of automation devices are encoded in the location codes; and generating a representation of the network topology of the distributed automation system based on location codes provided in the replies.

2. The method according to claim 1, wherein each automation device reached by the request and having ports for process peripheral devices, includes information on the process peripheral devices within the reply.

3. The method according to claim 1, whereby the information on the position of the automation device reached includes a network address of the automation device.

\* \* \* \* \*